(12) United States Patent
Pascher

(10) Patent No.: US 11,605,481 B2
(45) Date of Patent: Mar. 14, 2023

(54) DEVICE AND METHOD FOR PRODUCING ENAMELED WIRES

(71) Applicant: P & F MASCHINENBAU GMBH, Purkersdorf (AT)

(72) Inventor: Gerald Pascher, Purkersdorf (AT)

(73) Assignee: P & F MASCHINENBAU GMBH, Purkersdorf (AT)

(*) Notice: Subject to any disclaimer, the term of this patent is extended or adjusted under 35 U.S.C. 154(b) by 0 days.

(21) Appl. No.: 17/602,006

(22) PCT Filed: Apr. 9, 2020

(86) PCT No.: PCT/EP2020/060115
§ 371 (c)(1),
(2) Date: Oct. 7, 2021

(87) PCT Pub. No.: WO2020/208125
PCT Pub. Date: Oct. 15, 2020

(65) Prior Publication Data
US 2022/0165455 A1 May 26, 2022

(30) Foreign Application Priority Data
Apr. 10, 2019 (EP) .................................. 19168503

(51) Int. Cl.
*H01B 13/06* (2006.01)
*F01N 3/20* (2006.01)
(Continued)

(52) U.S. Cl.
CPC ......... *H01B 13/065* (2013.01); *F01N 3/2066* (2013.01); *H01B 13/0016* (2013.01);
(Continued)

(58) Field of Classification Search
CPC .............. H01B 13/065; H01B 13/0016; H01B 13/165; H01B 13/30; F01N 3/2066;
(Continued)

(56) References Cited

U.S. PATENT DOCUMENTS 3,706,533 A * 12/1972 Brewer .................... F23G 7/066
110/212
6,167,698 B1 * 1/2001 King .................. B01D 53/9431
60/281
(Continued)

FOREIGN PATENT DOCUMENTS

CN 105427968 A 3/2016
CN 207499951 U 6/2018
(Continued)

OTHER PUBLICATIONS

English translation of European Patent EP 2929927 A1 (Jul. 2014) (Year: 2014).*
Extended European Search Report EP 19168503.1 dated Aug. 19, 2020.

*Primary Examiner* — Brandon D Lee
(74) *Attorney, Agent, or Firm* — Daniel J. Chalker; Edwin S. Flores; Chalker Flores, LLP

(57) ABSTRACT

A device (1) and a method for producing enameled wires, comprises an application device (3) for applying at least one enamel coating, a furnace (4) for solidifying the enamel coating and an exhaust gas purification device (7) for removing at least nitrogen oxides from an exhaust gas (9) of the furnace (4). The exhaust gas purification device (7) has a unit (13) for the selective catalytic reduction of nitrogen oxides in the exhaust gas (9) of the furnace and a feeding apparatus (11) for feeding a reducing agent, preferably an ammonia-containing compound, in particular a urea solution, into the exhaust gas (9) of the furnace (4). The feeding apparatus (11) has at least one outlet opening, which is
(Continued)

designed in such a way that the reducing agent exits from the outlet opening substantially in the flow direction of the exhaust gas (9).

20 Claims, 4 Drawing Sheets

(51) Int. Cl.
H01B 13/00 (2006.01)
H01B 13/16 (2006.01)

(52) U.S. Cl.
CPC ........ H01B 13/165 (2013.01); *F01N 2570/14* (2013.01); *F01N 2610/02* (2013.01)

(58) Field of Classification Search
CPC ............. F01N 2570/14; F01N 2610/02; B01D 2255/1021; B01D 2255/20707; B01D 2255/20776; B01D 2255/904; B01D 2257/702; B01D 53/90; B01D 53/8656; B01D 2251/2067; B01D 2255/1023; B01D 2255/20723; B01D 2255/2092; B01D 2257/502; B01D 2257/704; B01D 53/8625; B05D 3/0406; B05D 2401/10; B05D 7/20; B05D 2505/00
USPC .......................................................... 60/295
See application file for complete search history.

(56) References Cited

U.S. PATENT DOCUMENTS

| | | | | |
|---|---|---|---|---|
| 8,230,677 | B2 * | 7/2012 | Devarakonda | F23J 15/003 60/276 |
| 2008/0022663 | A1 * | 1/2008 | Dodge | F01N 3/2066 60/286 |
| 2008/0155973 | A1 * | 7/2008 | Maruyama | F01N 3/2066 60/299 |
| 2017/0306819 | A1 * | 10/2017 | Alfieri | F01N 9/005 |
| 2018/0280948 | A1 * | 10/2018 | Biskupski | B01J 35/06 |
| 2019/0262809 | A1 * | 8/2019 | Sung | B01J 37/0246 |
| 2020/0063625 | A1 * | 2/2020 | Adelman | F01N 3/2066 |
| 2020/0078768 | A1 * | 3/2020 | Patchett | B01J 37/088 |
| 2020/0156022 | A1 * | 5/2020 | Manda Venkata Naga | B01F 25/3133 |
| 2020/0188895 | A1 * | 6/2020 | Petrovic | B01J 35/1019 |
| 2021/0178380 | A1 * | 6/2021 | Li | B01J 23/42 |

FOREIGN PATENT DOCUMENTS

| | | | | |
|---|---|---|---|---|
| DE | 102007055874 | A1 | 6/2008 | |
| DE | 102019118301 | A1 * | 2/2020 | ........... F01N 13/009 |
| EP | 2929927 | A1 * | 10/2015 | ......... B01D 53/8625 |
| EP | 2929927 | B1 | 2/2017 | |
| FR | 2120029 | A1 | 6/1973 | |

* cited by examiner

DEVICE AND METHOD FOR PRODUCING ENAMELED WIRES

CROSS-REFERENCE TO RELATED APPLICATIONS

This application is the National Stage of International Application No. PCT/EP2020/060115, filed on Apr. 9, 2020, which claims priority to EP 19168503.1, filed on Apr. 10, 2019, the entire contents of each of which is incorporated by reference herein.

TECHNICAL FIELD OF THE INVENTION

The present invention relates in general to the field of producing wire, and more particularly, to producing enamelled wire.

BACKGROUND OF THE INVENTION

None.

BRIEF SUMMARY OF THE INVENTION

The invention relates to a device for producing enamelled wires, comprising an application device for applying at least one enamel coating, a furnace for solidifying the enamel coating, and an exhaust gas purification device for removing at least nitrogen oxides from an exhaust gas of the furnace, wherein the exhaust gas purification device has a unit for selective catalytic reduction of nitrogen oxides in the exhaust gas of the furnace and a feeding apparatus for feeding a reducing agent, preferably an ammonia-containing compound, in particular a urea solution, into the exhaust gas of the furnace.

Furthermore, the invention relates to a method for producing enamelled wires, wherein at least one enamel coating is applied to a metal wire and is solidified in a furnace, wherein an exhaust gas from the furnace is freed at least of nitrogen oxides, wherein the exhaust gas from the furnace is subjected to a selective catalytic reduction of nitrogen oxides, wherein a reducing agent, preferably an ammonia-containing compound, in particular a urea solution, is fed to the exhaust gas via a feeding apparatus.

Such a device or such a method for producing enamelled wires with a circulating-air furnace for drying and curing enamel coatings applied to the wire is known from the prior art. The exhaust gas from the circulating-air furnace, which exhaust gas contains nitrogen oxides ($NO_x$) such as nitrogen monoxide (NO) and nitrogen dioxide ($NO_2$) due to the process, is passed through an exhaust gas purification device which has a unit for selective catalytic reduction. The unit comprises denitrification catalysts and an oxidation catalyst downstream of the denitrification catalysts. In the direction of flow of the exhaust gas upstream of the denitrification catalysts, an atomising nozzle projects perpendicularly to the direction of flow of the exhaust gas into a straight, tubular housing, in which the exhaust gas is transported to the catalysts. A urea-containing reducing agent is injected by means of the atomising nozzle into the exhaust gas perpendicularly to the direction of flow of the exhaust gas. The urea is converted to ammonia ($NH_3$) in the exhaust gas with the aid of thermolysis and hydrolysis, wherein the ammonia is used to reduce the nitrogen oxides to nitrogen ($N_2$) and water ($H_2O$) in the denitrification catalysts. Mixing apparatuses are arranged in the tubular housing between the injection of the reducing agent and the denitrification catalysts in order to effect a deflection of the exhaust gas flow. A disadvantage here is that, due to the injection, the injected reducing agent can form a film on an inner surface of the tubular housing. A further disadvantage is that the reducing agent is not optimally mixed with the exhaust gas and thus urea is not completely thermolysed and hydrolysed, so that deposits of solid urea may occur in the region of the injection and/or in the denitrification catalysts.

The problem addressed by the present invention is to alleviate or eliminate at least individual disadvantages of known installations for the production of enamelled wires. In particular, the invention aims to improve the mixing of the introduced reducing agent with the exhaust gas.

The present invention provides a device for producing enamelled wires, comprising an application device for applying at least one enamel coating, a furnace for solidifying the enamel coating, and comprising an exhaust gas purification device for removing at least nitrogen oxides from an exhaust gas of the furnace, wherein the exhaust gas purification device has a unit for selective catalytic reduction of nitrogen oxides in the exhaust gas of the furnace and a feeding apparatus for feeding a reducing agent, preferably an ammonia-containing compound, in particular urea solution, into the exhaust gas of the furnace, wherein the feeding apparatus has at least one outlet opening, which is designed in such a way that the reducing agent exits from the outlet opening substantially in the direction of flow of the exhaust gas.

This solves the aforementioned problem.

Accordingly, the invention also provides a method for producing enamelled wires, wherein at least one enamel coating is applied to a metal wire and is solidified in a furnace, wherein an exhaust gas from the furnace is freed at least of nitrogen oxides, wherein the exhaust gas from the furnace is subjected to a selective catalytic reduction of nitrogen oxides, wherein a reducing agent, preferably an ammonia-containing compound, in particular a urea solution, is fed to the exhaust gas via a feeding apparatus, wherein the reducing agent is introduced substantially in the direction of flow of the exhaust gas.

This also solves the aforementioned problem.

With the method according to the invention, film formations and deposits of the reducing agent can be reduced. Due to the reducing agent introduced substantially in the direction of flow of the exhaust gas via the outlet opening, the transport of the reducing agent perpendicularly to the direction of flow of the exhaust gas in the direction of an edge of the exhaust gas flow is minimised, so that deposits on walls inside which the exhaust gas is guided are reduced. In this way, a homogeneous introduction of the reducing agent into the exhaust gas can be achieved, so that the reducing agent is distributed relatively homogeneously in the flow cross-section of the exhaust gas. The reducing agent is introduced here into the flowing exhaust gas using the co-current principle, so that the reducing agent, when it exits from the outlet opening, flows in substantially the same direction as the exhaust gas into which the reducing agent is introduced.

According to a preferred embodiment, a part of the feeding apparatus is arranged in a bent pipe section, wherein the bent pipe section has a curvature of between 60 and 150°, preferably between 75 and 120°, particularly preferably between 80 and 100°, in particular substantially 90°. Advantageously, this means that a part of the feeding apparatus around which the exhaust gas flows and which feeds the reducing agent to the exhaust gas can be designed without changes in direction, so that the cross-section of the feeding apparatus transverse to the direction of flow of the exhaust gas and thus the flow resistance of the exhaust gas through the feeding apparatus is reduced. Furthermore, this makes it easier to clean the feeding apparatus, as foreign particles and/or urea that may accumulate at the outlet opening or in the feeding apparatus can be easily cleaned via an external access. Due to the straight design of the part of the feeding apparatus around which the exhaust gas flows, there are no risk zones in this section of the feeding apparatus, such as kinks, corners, protruding edges, joints, weld seams or dead zones with vortices, where deposits can occur already when the reducing agent is fed in. A further advantage of the straight design of the part of the feeding apparatus around which the exhaust gas flows is the much simpler and more economical manufacture of the feeding apparatus.

According to a particularly preferred embodiment, the part of the feeding apparatus arranged in the bent pipe section is enclosed, apart from the outlet opening, by a protective pipe. This shields the feeding apparatus from the flowing exhaust gas so that condensation of, for example, enamel residues at cool points of the feeding apparatus can be reduced or prevented.

To protect the outlet opening, it is advantageous if the protective pipe extends in the direction of flow of the exhaust gas substantially as far as the outlet opening. Advantageously, the outlet opening is completely surrounded by the protective pipe and is thus protected from high temperatures or flow influences of the exhaust gas flowing past, such as shear flows of the exhaust gas.

Furthermore, it is favourable if the feeding apparatus has a feed line with the at least one outlet opening, wherein the outlet opening has a nozzle which is oriented substantially in the direction of flow of the exhaust gas for injecting the reducing agent substantially in the direction of flow of the exhaust gas. This enables precise injection of the reducing agent into the exhaust gas. Preferably, the feed line is a nozzle lance.

For improved mixing of the reducing agent with the exhaust gas, it is favourable if the nozzle of the outlet opening is an atomising nozzle for splitting the reducing agent, in particular into fine droplets. Advantageously, the reducing agent can thus be injected into the exhaust gas in the form of a finely distributed spray in order to quickly evaporate liquid components of the reducing agent.

According to a preferred embodiment, the atomising nozzle is a two-substance nozzle comprising a nozzle inner chamber and a nozzle outer chamber, wherein the nozzle inner chamber is for feeding a first medium, wherein the first medium contains the reducing agent, preferably the ammonia-containing compound, in particular the urea solution, wherein the nozzle outer chamber is for feeding a second medium, preferably compressed air. This allows the reducing agent to be injected into the exhaust gas with the aid of compressed air to enable fine distribution of the reducing agent in the exhaust gas. Preferably, the pressure of the compressed air is between 1 and 20 bar, particularly preferably between 3 and 12 bar, in particular between 5 and 7 bar. Advantageously, smaller opening angles of the spray (spray angle) are possible with the two-substance nozzle, so that the transport of the reducing agent to the boundary region of the exhaust gas flow is reduced or avoided when injecting the reducing agent into the exhaust gas.

According to a particularly preferred embodiment, the two-substance nozzle is an externally mixing two-substance nozzle which has a mixing chamber, wherein the nozzle inner chamber and the nozzle outer chamber are separately connected to the nozzle outlet for the separate discharge of the first medium and the second medium, preferably the compressed air, from the two-substance nozzle. In this context, "externally mixing" means that the reducing agent is first guided by negative pressure or gravity into the flow of the second medium, which is used for atomisation, in the nozzle outlet and is atomised there. Advantageously, the two-substance nozzle has a pipe-in-pipe system, in which an inner pipe transports the first medium to the nozzle inner chamber and an outer pipe arranged coaxially around the inner pipe transports the second medium to the nozzle outer chamber. This allows the reducing agent in the first medium to be thermally sealed off from the exhaust gas by the second medium in order to avoid overheating of the nozzle. In the case of the externally mixing two-substance nozzle, the first medium can contain a further compressed air in addition to the reducing agent.

According to another particularly preferred embodiment, the two-substance nozzle is an internally mixing two-substance nozzle which has a nozzle outlet, wherein the nozzle inner chamber and the nozzle outer chamber are connected to the mixing chamber for mixing the first medium with the second medium, preferably the compressed air, in the mixing chamber. In this context, "internally mixing" means that the reducing agent and the second medium, which is used for atomisation, are mixed in the mixing chamber even before the nozzle outlet. This allows a particularly fine spray to be generated.

In order to further increase the mixing of the reducing agent with the exhaust gas, it is favourable if the exhaust gas purification device has, in the direction of flow of the exhaust gas downstream of the feeding apparatus and upstream of the unit for selective catalytic reduction of nitrogen oxides, a conical pipe section for the flow of the exhaust gas therethrough, wherein the diameter of the conical pipe section increases in the direction of flow of the exhaust gas, wherein the fed reducing agent is introduced into the conical pipe section at least in stages. This allows the introduced reducing agent to spread further in a radial direction in relation to the flow of the exhaust gas without contacting a wall that delimits the flow of exhaust gas. Another advantage is the increased residence time of the reducing agent in the exhaust gas due to the decreasing flow velocity of the exhaust gas caused by the cross-sectional widening. Advantageously, this allows thermolysis and/or hydrolysis of the reducing agent to take place in the conical pipe section, so that a completely thermolysed and/or hydrolysed reducing agent can be fed to the unit for selective catalytic reduction downstream of the conical pipe section even at high dosing rates of the reducing agent.

It is further advantageous if the introduced reducing agent, preferably the introduced ammonia-containing compound, in particular the introduced urea solution, is liquid and evaporates in the conical pipe section, thus forming ammonia. As a result, a reducing agent introduced in liquid form can evaporate in the conical pipe section and thus a completely evaporated reducing agent can be fed to the unit for selective catalytic reduction downstream of the conical pipe section. This reduces or prevents film formation and deposits in the unit for selective catalytic reduction.

For improved flow guidance, it is favourable if the conical pipe section has a half opening angle between 1 and 10°, preferably between 2 and 7°, particularly preferably between 3 and 5°, in particular substantially 4°. Advantageously, the exhaust gas flow adapts to the course of the inner wall of the conical pipe section, so that separation of the flow at the inner wall is avoided. This suppresses the formation of flow vortices which, although they increase the mixing of the reducing agent with the exhaust gas, can lead to an inhomogeneous distribution of the reducing agent in the exhaust gas.

According to a preferred embodiment, the unit for selective catalytic reduction has at least one denitrification catalyst and at least one oxidation catalyst for breaking down carbon monoxide and/or hydrocarbons and/or ammonia, wherein preferably at least two, in particular exactly two, denitrification catalysts are provided in succession in the direction of flow of the exhaust gas. This enables the reducing agent to convert the nitrogen oxides into nitrogen and water. Advantageously, ammonia formed from the reducing agent in the denitrification catalysts reacts catalytically with the nitrogen oxides in the exhaust gas to form nitrogen and water. In the oxidation catalyst, pollutants such as carbon monoxide (CO) and unburned hydrocarbons ($C_mH_n$) can react to form carbon dioxide ($CO_2$) and water.

According to a particularly preferred embodiment, the at least one denitrification catalyst has a first coated metal support and a first washcoat and the oxidation catalyst has a second metal support and a second washcoat, wherein preferably the first washcoat comprises oxides of titanium, vanadium and/or tungsten and the second washcoat comprises platinum and/or palladium. Due to the coated metal supports, the at least one denitrification catalyst and the at least one oxidation catalyst are mechanically more resistant than, for example, fully extruded ceramic catalysts, so that they can be used at higher temperatures and are better protected against mechanical damage during transport. Advantageously, the reaction surface of the at least one denitrification or oxidation catalyst is increased by imprinting the first or second washcoat on the first or second coated metal support, so that the efficiency of the chemical reactions taking place in the catalysts is increased.

According to a preferred embodiment, the mass flow of the exhaust gas and the concentrations of the nitrogen oxides in the exhaust gas are determined in the direction of flow before the reducing agent is fed and in the direction of flow after the selective catalytic reduction, wherein the amount of the introduced reducing agent, preferably the introduced ammonia-containing compound, in particular the introduced urea solution, is determined based on the determined mass flow of the exhaust gas and the determined concentrations of the nitrogen oxides in the exhaust gas. In this way, the amount of reducing agent introduced into the exhaust gas can be determined on the basis of the determined concentrations of nitrogen oxides in the exhaust gas and this amount can be fed to the exhaust gas via the feeding apparatus.

According to a particularly preferred embodiment, the amount of the introduced reducing agent, preferably the introduced ammonia-containing compound, in particular the introduced urea solution, stoichiometrically required for reduction of the nitrogen oxides in the exhaust gas is determined based on the determined concentrations of the nitrogen oxides in the exhaust gas. In this way, advantageously, exactly the amount of reducing agent that is stoichiometrically required for the nitrogen oxides present in the exhaust gas is fed to the exhaust gas. Advantageously, a measured temperature of the exhaust gas and a measured dynamic pressure of the exhaust gas for determining the mass flow of the exhaust gas are taken into account in addition to the determined concentrations of the nitrogen oxides for determining the required amount of the reducing agent.

BRIEF DESCRIPTION OF THE DRAWINGS

The invention is further explained below with reference to the non-limiting exemplary embodiment shown in the drawings.

DETAILED DESCRIPTION OF THE INVENTION

Figure 1:
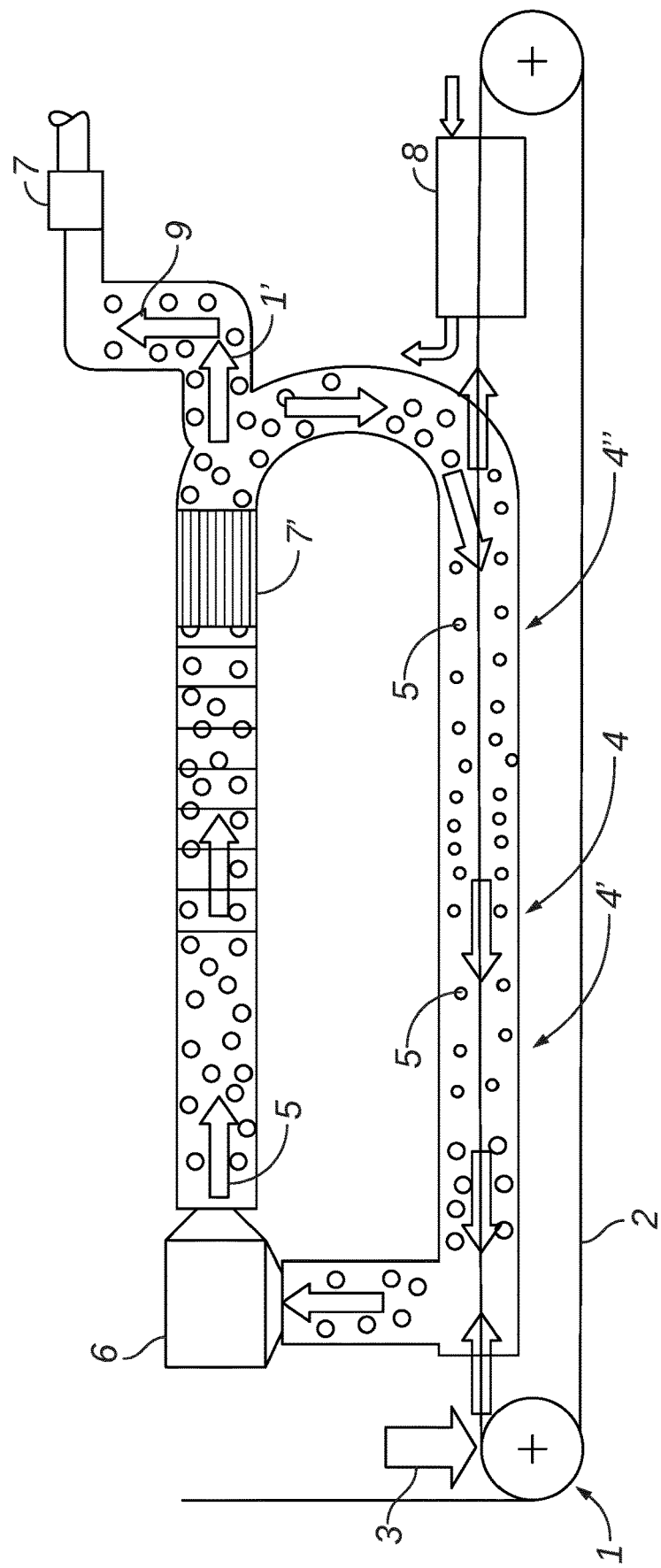
FIG. 1 schematically shows a device for producing enamelled wires.

FIG. 1 shows a device 1 for producing enamelled wires 2. The device 1 has an application device 3 for applying a plurality of enamel coatings to a metal wire. In addition, a furnace 4 is provided for drying and curing the enamel coatings on the metal wire. The furnace 4 has a drying zone 4' and a curing zone 4". Circulating air 5 is circulated in the furnace 4 by means of a fan 6. The circulating air 5 is enriched with various pollutants, as will be explained in detail below. In addition, a circulating-air oxidation catalyst 7' is provided as well as, in a line carrying exhaust gases 9, an exhaust gas purification unit 7 for removing the pollutants, in particular nitrogen oxides, from the exhaust gas of the furnace. FIG. 1 also shows a cooler 8 for cooling the enamelled wire.

The wire insulation is produced by drying and curing the liquid coating layers applied to the wire in the circulating-air furnace 4 at approx. 550-700° C. Since the application of the required final coating thickness must be carried out in several passes, up to 24 covers of the same wire are passed through the drying or curing furnace. During the drying of the liquid enamel coatings on the metal wire, enamel solvents are evaporated at high temperature, causing the circulating air of the wire enamelling installation to become continuously saturated with solvent vapour along the drying zone.

During air circulation operation, the solvent-laden air constantly flows through a palladium-platinum catalyst, which serves as a circulating-air oxidation catalyst 7', whereby the hydrocarbons ($C_mH_n$=solvent vapour) are exothermically oxidised with the oxygen $O_2$ of the fresh air drawn into the furnace to form carbon dioxide $CO_2$ and water vapour $H_2O$. During this exothermic chemical reaction, thermal energy is therefore released, which heats the process air. However, the solvent nitrogen can also be increasingly oxidised there to form nitrogen oxides $NO_x$ (predominantly nitrogen monoxide NO, nitrogen dioxide $NO_2$). The conversion rate in the circulating-air oxidation catalyst 7' generally increases with rising temperature level. In areas outside the catalyst, the solvent-air mixture can already react chemically prematurely due to the sufficiently high temperature level (e.g. drying zone, heating zone).

The mass flows of air and solvent introduced into the system are approximately constant during production. Due to the process, a hot exhaust gas 9 is extracted directly after the circulating-air catalyst and discharged into the surrounding environment. The exhaust gas is discharged via a steel pipe with an internal diameter of 80 mm by means of a radial blower. A vertically oriented counter-current heat exchanger is usually flange-mounted directly on the pipe outlet and uses the thermal energy of the exhaust gas to generate water vapour as a protective and cleaning gas for the annealing process of the raw wire. In standard operation, the exhaust gas temperature upstream of the evaporator is between 300-500° C. and downstream of the evaporator is about 250-280° C.

Relevant pollutant components in the exhaust gas of the installation during the enamelling process are carbon monoxide CO, remaining volatile organic substances (hydrocarbons specified as total bound carbon or total C) and nitrogen oxides $NO_R$. CO is produced by the incomplete combustion of hydrocarbons. Remaining residual amounts of hydrocarbons in the furnace exhaust gas are attributed to the fact that the solvent vapours present are insufficiently oxidised in the air circulation process, especially in the circulating-air catalyst 7'. This can be caused, for example, by an overloading of the process air with hydrocarbons (i.e. if the solvent input into the system is too high), an insufficient temperature level in the circulating-air catalyst or also by too little reactive oxygen (fresh air feed or exhaust gas amount) in the system.

$NO_x$ in wire enamelling machines is what is known as fuel $NO_x$ and not thermal $NO_x$. The formation of $NO_x$ in the enamelling process is thus largely based on the chemical reaction of the nitrogen components bound in the fuel (enamel solvent) with atmospheric oxygen. Thermal $NO_x$ would be formed from the nitrogen in the air at temperatures of over 1000° C. Nevertheless, experience shows that higher temperatures promote the chemical conversion rate of $N_2$ to $NO_x$ (especially in the circulating-air catalyst). A major source of $NO_x$ in wire coating is the solvent NMP (N-methyl-2-pyrrolidone), which is the basic solvent of the polyamideimide (PAI) enamel often used as an overcoat. NMP contains high amounts of nitrogen, which is oxidised to form $NO_x$ in the furnace process, especially in high-temperature areas (e.g. heating zone, circulating-air catalyst).

In horizontal installations for enamelling round wires with diameters of up to 1.6 mm, exhaust gas quantities of approx. 65-70 $Nm^3/h$ are present. As mentioned above, the exhaust gas contains residual amounts of nitrogen monoxide NO, nitrogen dioxide $NO_2$, carbon monoxide CO and remaining residual solvent components in the form of unburned hydrocarbons $C_nH_m$, which are to be actively cleaned. The pollutant limits for industrial exhaust gas are set by a wide variety of legal standards.

Figure 2:
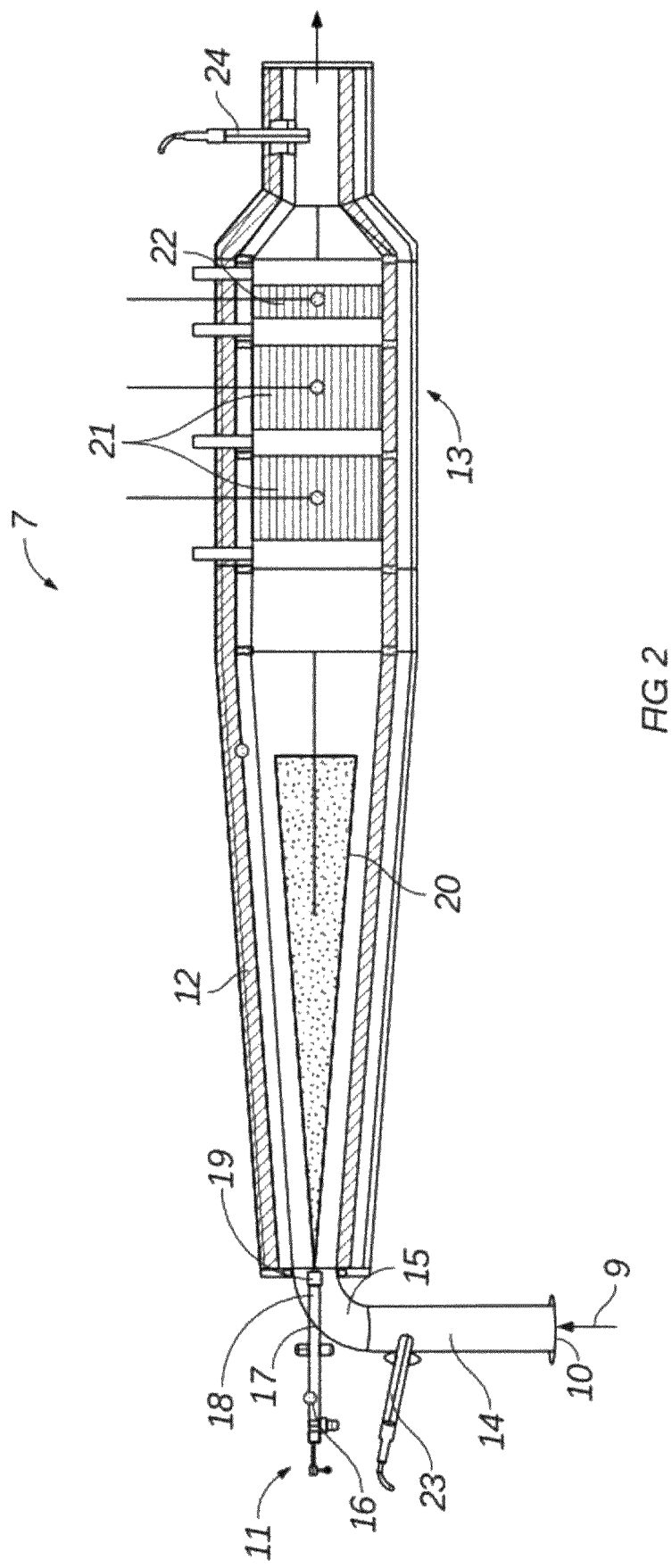
FIG. 2 schematically shows a sectional view of an exhaust gas purification device according to the invention for the device according to FIG. 1.

FIG. 2 shows an exhaust gas purification device 7 according to the invention, which has a connection element 10 for connecting the exhaust gas purification device 7 to the steel pipe of the furnace 4 provided for discharging the exhaust gas 9, a feeding apparatus 11, a conical pipe section 12 and a unit 13 for selective catalytic reduction. In principle, the exhaust gas purification device 7 can be installed in any exhaust air pipeline. The exhaust gas cleaning device 7 can be oriented horizontally or vertically. Since vertical orientation makes it more difficult to access the exhaust gas cleaning device 7 for maintenance and repairs, horizontal orientation of the exhaust gas cleaning device 7 is preferred in horizontal installations for enamelling round wires.

In the embodiment shown, the exhaust gas 9 of the circulating-air furnace 4 is directed via a straight vertical pipe section 14 to a 90° bent pipe section 15 and subsequently into the conical pipe section 12. In the bent pipe section 15, in which the exhaust gas 9 is diverted from a vertical to a horizontal flow, the feeding apparatus 11 is arranged in part, wherein the feeding apparatus 11 has a feed line which, in the embodiment shown, is embodied as a straight nozzle lance 16. The nozzle lance 16 is horizontally guided through a hole 17 in the bent pipe section 15, so that one end 18 of the nozzle lance 16 is arranged in a circular vertical cross-sectional area at the end of the bent pipe section 15 which is adjacent to the conical pipe section 12 and in which the flow of the exhaust gas 9 is horizontally oriented. An outlet opening is arranged at the end 18 of the nozzle lance 16, which in the embodiment shown is a two-substance nozzle 19. In this case, the two-substance nozzle 19 is arranged at the centre of the circular vertical cross-sectional area at the end of the bent pipe section 15 which is adjacent to the conical pipe section 12, so that the nozzle outlet of the two-substance nozzle 19 points towards the centre of the circular opening of the conical pipe section 12 which is adjacent to the bent pipe section 12 and coincides with the circular vertical cross-sectional area of the bent pipe section 12. In the direction of flow of the exhaust gas 9, the cross-section of the conical pipe section 12 increases so that the conical pipe section 12 has a half opening angle of 4°. The increasing cross-section in the conical pipe section 12 reduces the flow velocity of the exhaust gas 9. The conical pipe section and the unit 13 for selective catalytic reduction are thermally insulated with a 50 mm thick layer of mineral wool so that the exhaust gas 9 does not cool down too much between the injection of the reducing agent and the unit 13 for selective catalytic reduction.

In the embodiment shown, a reducing agent is injected into the exhaust gas together with compressed air via the two-substance nozzle 19, wherein the spray 20 formed during injection projects into the conical pipe section 12. Since the nozzle outlet of the two-substance nozzle 19 points towards the centre of the circular opening of the conical pipe section 12, the reducing agent is injected in the form of fine droplets together with the compressed air substantially in the direction of flow of the exhaust gas 9 in the middle of the flowing exhaust gas 9 in order to achieve homogeneous mixing of the exhaust gas 9 with the reducing agent. In the embodiment shown, an aqueous urea solution with a mass fraction of urea $(NH_2)2CO$ of 32.5% is used as reducing agent. This aqueous urea solution is known from the vehicle industry as "AdBlue". After injecting the reducing agent into the exhaust gas 9 via the two-substance nozzle 19, the urea $(NH_2)2CO$ is thermolysed to form ammonia $NH_3$ and isocyanic acid HNCO with the help of the hot exhaust gas 9. The water $H_2O$ of the reducing agent evaporates completely and reacts with the isocyanic acid HNCO to form ammonia $NH_3$ and carbon dioxide $CO_2$. Due to the homogeneous mixing with the exhaust gas 9 and the longer residence time in the conical pipe section 12 due to the decreasing flow velocity of the exhaust gas 9, the urea and the isocyanic acid are completely converted into vaporous ammonia in the conical pipe section 12.

In the embodiment shown, downstream of the conical pipe section 12 in the direction of flow of the exhaust gas is the unit 13 for selective catalytic reduction, which has two denitrification catalysts 21 and one oxidation catalyst 22. The denitrification catalysts 21—also called SCR catalysts—are coated solid metal supports with a first metal support and a cell density of 300 cpsi. Metal supports, in contrast to ceramic products, are characterised by a much higher temperature resistance and mechanical resistance. This means that the SCR catalyst could also be used in enamelled wire furnace types, where much higher exhaust air temperatures of up to 650° C. are present. The mechanical resistance protects the metal catalysts from damage during transport, which occurs more easily in the case of ceramic catalysts. A first washcoat of aluminium oxide with a very high specific surface area is imprinted on the first metal support and is coated with the relevant oxides of titanium, vanadium and/or tungsten. The applied first washcoat significantly increases the reaction surface of the denitrification catalysts 21, thereby increasing the efficiency of the chemical reactions taking place. Of particular importance in the case of the coated metal catalysts is the lower ammonia storage capacity, which allows a much faster readjustment of the AdBlue dosage in the event of changing $NO_x$ loadings of the unit. This can significantly reduce the risk of stoichiometric overdosing of AdBlue, which is very relevant for the formation of urea deposits in the denitrification catalyst 21. Due to their structural design with high porosity, ceramic extrudates have a greater tendency to store ammonia, as a result of which the chemical reactions and thus also the control of the urea dosage are particularly sluggish.

In the two denitrification catalysts 21 of the unit for selective catalytic reduction, the vaporised ammonia $NH_3$ reacts with nitrogen monoxide NO and nitrogen dioxide $NO_2$ as well as oxygen $O_2$ from the exhaust gas 9 and the compressed air to form nitrogen $N_2$ and water vapour $H_2O$.

Downstream of the two denitrification catalysts 21 connected in series, in the direction of flow of the exhaust gas 9, is the oxidation catalyst 22, which is a coated solid metal support with a second metal support and a cell density of 300 cpsi. A second washcoat of aluminium oxide with a very high specific surface area, which is coated with platinum and/or palladium, is applied to the second metal support. The applied second washcoat significantly increases the reaction area of the oxidation catalyst 22, thereby increasing the efficiency of the chemical reactions taking place. In the oxidation catalyst 22, hydrocarbons $C_nH_m$ and carbon monoxide CO remaining in the exhaust gas 9 react to form carbon dioxide $CO_2$ and water vapour $H_2O$. Excess ammonia $NH_3$, which did not react in the denitrification catalysts 21, reacts to form nitrogen $N_2$ and $H_2O$. Between the two denitrification catalysts 21 connected in series and the oxidation catalyst 22, a gap with a minimum gap width of 10 mm is provided in each case between two adjacent catalysts in order to achieve better mixing of the exhaust gas flow through generated turbulences after the exhaust gas 9 leaves the catalysts.

In the embodiment shown, a first $NO_x$ sensor 23 for measuring the concentration of the nitrogen oxides in the exhaust gas 9 before the injection of the reducing agent is arranged at the straight vertical pipe section 14. Furthermore, downstream of the oxidation catalyst 22 in the direction of flow of the exhaust gas 9 there is arranged a second $NO_x$ sensor 24 for measuring the concentration of nitrogen oxides in the exhaust gas 9 after the unit 13 for selective catalytic reduction. The nitrogen oxide concentrations measured with the aid of the first 23 and second 24 $NO_x$ sensors are used to calculate the amount of ammonia required stoichiometrically to reduce the concentration of nitrogen oxides in the exhaust gas 9 after the unit 13 for selective catalytic reduction to a legally specified target value. The $NO_x$ measurement with the first $NO_x$ sensor 23 is used to calculate the stoichiometric target injection amount of urea solution. The $NO_x$ measurement with the second $NO_x$ sensor 24 is used to check the result of the chemical process and to control the dosing amount of the urea solution accordingly. Furthermore, the mass flow and the temperature of the exhaust gas 9 are taken into account for calculating the stoichiometrically required amount of ammonia. The mass flow of the exhaust gas is determined, for example, with the aid of a dynamic pressure measured via a Prandtl tube or a differential pressure of the exhaust gas 9 measured via a Venturi tube. The amount of ammonia stoichiometrically required for the conversion of the nitrogen oxides of the exhaust gas 9 is used to determine the amount of urea or urea solution injected via the two-substance nozzle 19. Due to the parallel injection of the reducing agent into the exhaust gas 9, not only is the deposition due to wall film formation of the reducing agent minimised, but also a much finer signal of the current $NO_x$ output concentration or the current dosing amount with low oscillations and low amplitudes is achieved.

Figure 3:
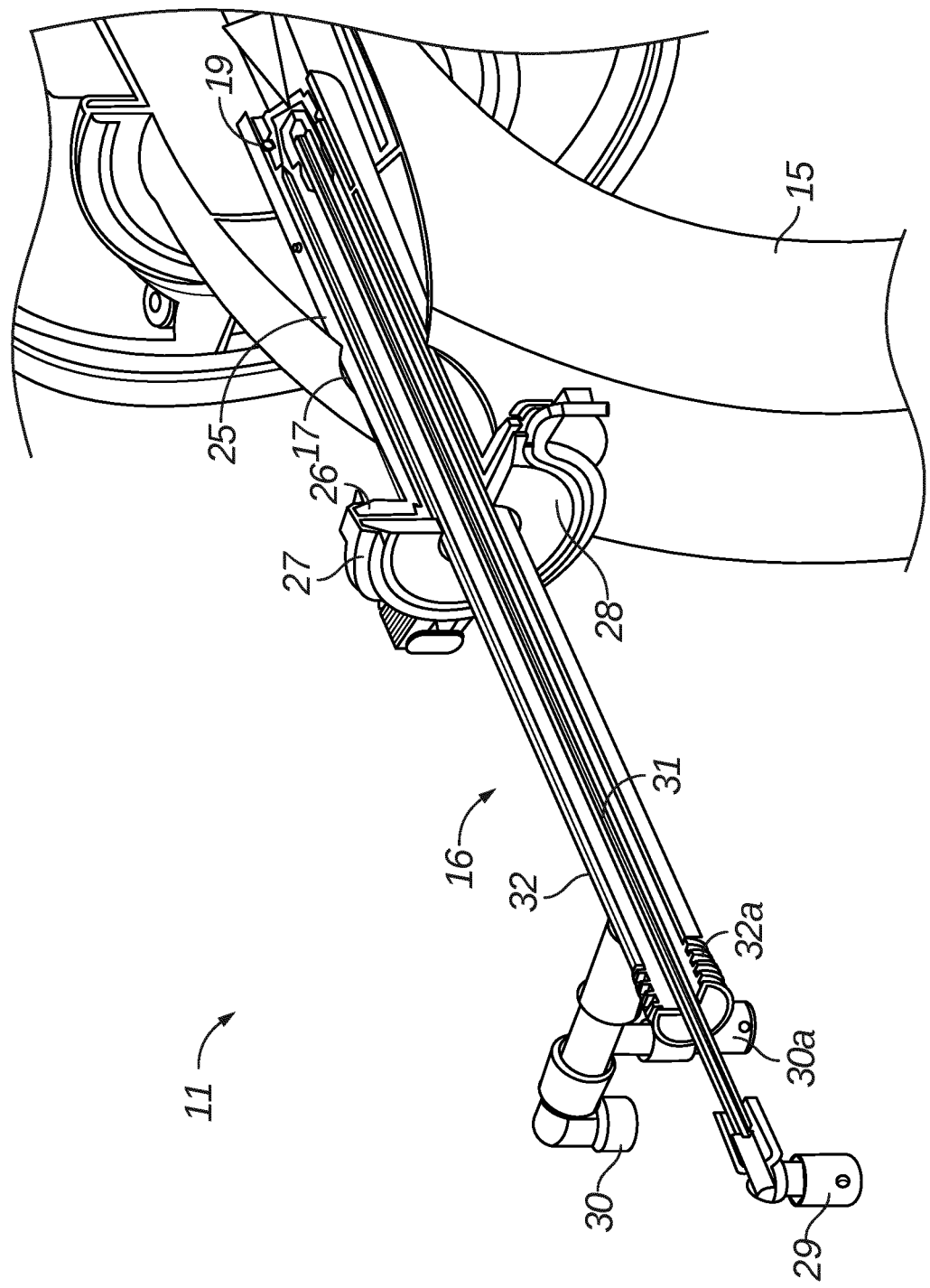
FIG. 3 schematically shows a view of a feeding apparatus of the exhaust gas purification device according to FIG. 2.

FIG. 3 shows the bent pipe section 15 and the feeding apparatus 11 of the exhaust gas purification device 7 according to the invention as shown in FIG. 2. The part of the feeding apparatus 11 arranged in the bent pipe section 15 is enclosed by a protective pipe 25 which shields the nozzle lance 16 and the two-substance nozzle 19 from the exhaust gas flowing through the bent pipe section 15. In this way, the protective pipe prevents possible deposits of enamel residues on the partly cool surface of the nozzle lance 16 and the two-substance nozzle 19 and also protects the entire two-substance nozzle 19 against the partly transversely inflowing exhaust gas 9. To protect the outlet opening of the two-substance nozzle 19, the protective pipe 25 extends in the direction of flow of the exhaust gas 9 as far as the outlet opening. This means that the outlet opening of the two-substance nozzle 19 is completely enclosed by the protective pipe 25 and is thus protected from high temperatures and flow influences of the exhaust gas 9 flowing past. The protective pipe 25 is welded to the bent pipe section and partially protrudes from it, wherein a flange 26 is attached to the end of the protective pipe 25 located outside the bent pipe section 15. The flange 26 of the protective pipe 25 is connected by means of a clamping ring 27 to a flange 28 attached to the nozzle lance 16, so that the nozzle lance 16 and the two-substance nozzle 19 are fixed in the protective pipe 25. When the clamping ring 27 is loosened, the nozzle lance 16 with the two-substance nozzle 19 can be pulled out of the protective pipe 25 for maintenance of the two-substance nozzle 19.

In the embodiment shown, the feeding apparatus 11 has a first line 29 for feeding the reducing agent and a second line 30 for feeding the compressed air at a standard pressure of 6 bar. The first line 29 guides the reducing agent from a pump (not shown) into an inner pipe 31, which is arranged in the nozzle lance 16 and guides the reducing agent to the two-substance nozzle 19. The second line 30 guides compressed air into an outer pipe 32 arranged coaxially around the inner pipe 31, which outer pipe is arranged in the nozzle lance 16 and guides the compressed air to the two-substance nozzle 19. Shortly before the second line 30 enters the outer pipe 32, there is arranged a branch 30a of the second line 30, which leads to a compressed air inlet of the pump. In the event of a leakage of the second line 30, no compressed air would then flow through the nozzle or through the pump, and this would be immediately detected by a pressure sensor of the pump. In this way, the entry of liquid reducing agent without compressed air into a forcibly highly heated nozzle and the associated urea deposits can be prevented. At the beginning of the outer pipe 32, the nozzle lance 16 has a compensator 32a, which can compensate for thermally induced different longitudinal expansions of the inner pipe 31 and outer pipe 32.

In the direction of flow of the exhaust gas 9 upstream of the unit 13 for selective catalytic reduction, the temperature of the exhaust gas 9 is measured for control purposes, as the exhaust gas temperature should be between 220 and 550° C. Exhaust gas temperatures below 220° C. inhibit the decomposition of urea into ammonia or can promote its crystallisation. Exhaust gas temperatures above 550° C. require larger amounts of urea for chemical reasons and can more easily lead to overheating of the two-substance nozzle 19. Outside the permissible temperature range between 220 and 550° C., no reducing agent is injected. Furthermore, in the device according to the invention, a wire movement is checked via a rewinder signal, wherein no reducing agent is injected in the absence of a wire movement. With the aid of a measurement of the concentration of oxygen in the exhaust gas 9 in the direction of flow of the exhaust gas 9 upstream of the unit 13 for selective catalytic reduction, it is checked whether or not enamel is being introduced into the device according to the invention. If enamel is not being introduced, no reducing agent is injected into the exhaust gas 9 via the two-substance nozzle 19. If the device according to the invention fails or is shut down, the lines carrying the reducing agent and the nozzle lance 16 are flushed and completely emptied. A check of the filling level of a reducing agent tank by means of a float switch secures the pump against dry running. Sufficiently long pre-cooling times of the two-substance nozzle 19 with compressed air before starting the injection of the reducing agent prevents overheating of the inner pipe 31 of the nozzle lance 16 and thus boiling of the aqueous urea solution and urea failure in the two-substance nozzle 19. Sufficiently long flushing of the reducing agent-carrying lines with compressed air after the end of injection eliminates remaining reducing agent in the nozzle lance 16 and in the two-substance nozzle 19.

Figure 4:
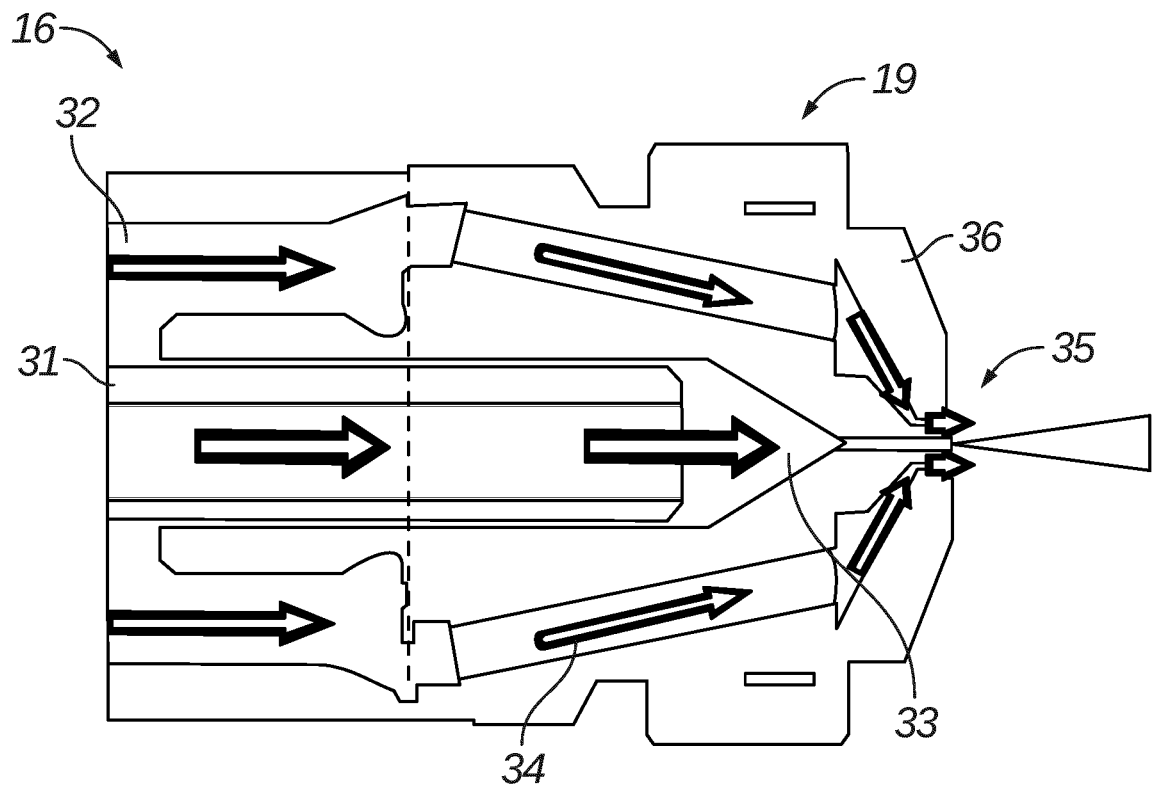
FIG. 4 schematically shows a sectional view of a first embodiment of a two-substance nozzle of the feeding apparatus according to FIG. 3.

FIG. 4 shows a first embodiment of the two-substance nozzle 19, wherein the two-substance nozzle 19 is designed as an externally mixing two-substance nozzle. The externally mixing two-substance nozzle has a nozzle inner chamber 33, a nozzle outer chamber 34 and a nozzle outlet 35, which is arranged in a nozzle cap 36. In the shown embodiment according to FIG. 3, the inner pipe 31 of the nozzle lance 16 guides a mixture of the reducing agent and another compressed air to the nozzle inner chamber 33 of the externally mixing two-substance nozzle and the outer pipe 32 of the nozzle lance 16 guides the compressed air to the nozzle outer chamber 34 arranged coaxially around the nozzle inner chamber 33. The nozzle inner chamber 33 and the nozzle outer chamber 34 are connected separately to the nozzle outlet 35 so that the mixture of the reducing agent and the further compressed air exits the externally mixing two-substance nozzle separately from the compressed air. The nozzle cap 36 has a small depth, whereby the atomisation of the reducing agent takes place directly at the nozzle outlet 35. This results in a considerably lower back-pressure in the second line 30 to the pump, so that a diaphragm pump, for example, can be used as the pump. The nozzle cap 36 of the externally mixing two-substance nozzle can be unscrewed at any time and replaced by another cap.

Figure 5:
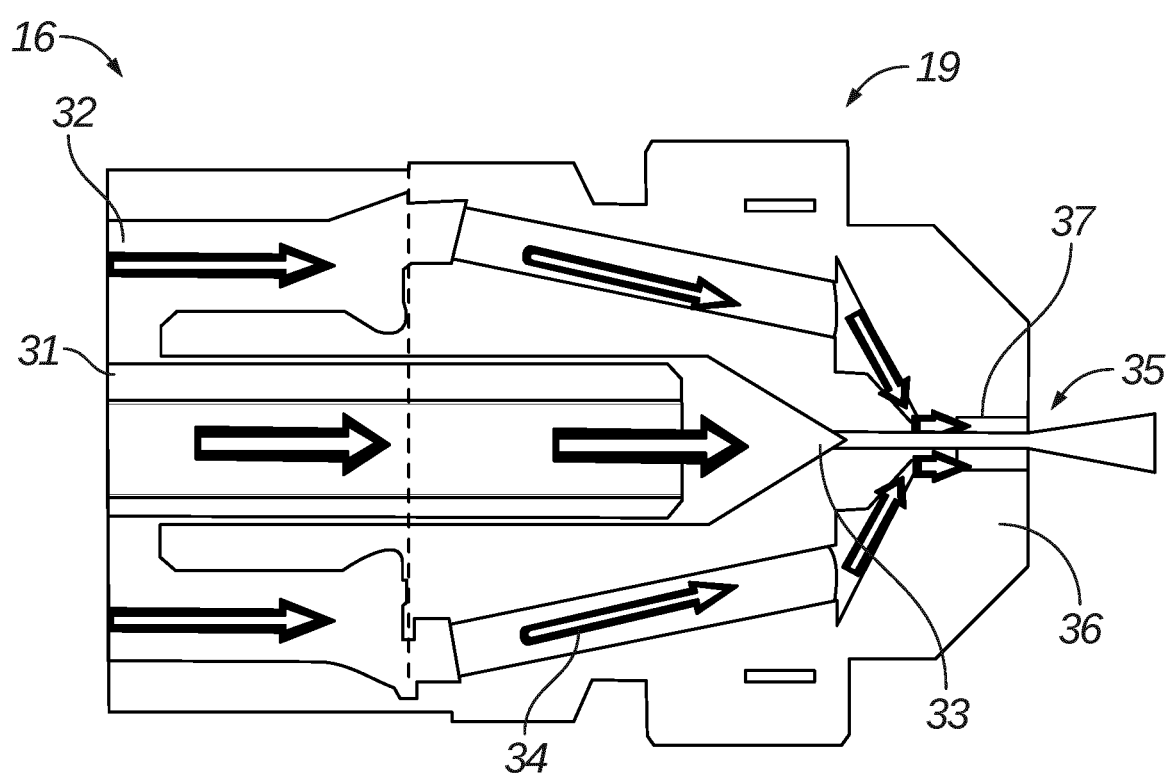
FIG. 5 schematically shows a sectional view of a second embodiment of a two-substance nozzle of the feeding apparatus according to FIG. 3.

FIG. 5 shows a second embodiment of the two-substance nozzle 19, wherein the two-substance nozzle 19 is designed as an internally mixing two-substance nozzle. The internally mixing two-substance nozzle has a nozzle inner chamber 33, a nozzle outer chamber 34, a mixing chamber 37 and a nozzle outlet 35. In the shown embodiment according to FIG. 5, the inner pipe 31 of the nozzle lance 16 guides the reducing agent to the nozzle inner chamber 33 of the internally mixing two-substance nozzle and the outer pipe 32 of the nozzle lance 16 guides the compressed air to the nozzle outer chamber 34 arranged coaxially around the nozzle inner chamber 33. The nozzle inner chamber 33 and the nozzle outer chamber 34 are connected to the mixing chamber 37 for mixing the reducing agent with the compressed air. From the mixing chamber 37, the reducing agent mixed with the compressed air exits the internally mixing two-substance nozzle via the nozzle outlet 35. When using an internally mixing two-substance nozzle, a pure reducing agent such as the aqueous urea solution can be fed to the nozzle inner chamber 33 via the inner pipe 31 without compressed air. In this case, for example, an electric gear pump can build up the necessary pressure and the dosing rate of the reducing agent can be controlled, for example, via a differential pressure measurement at the positions before and after a proportional valve of the gear pump.

The invention claimed is:

1. A device (1) for producing enamelled wires, comprising:
a furnace (4) for solidifying an enamel coating; and
an exhaust gas purification device (7) for removing at least nitrogen oxides from an exhaust gas (9) of the furnace (4), wherein the exhaust gas purification device (7) has a unit (13) for selective catalytic reduction of nitrogen oxides in the exhaust gas (9) of the furnace and a feeding apparatus (11) for feeding a reducing agent into the exhaust gas (9) of the furnace (4), wherein the feeding apparatus (11) comprises a straight nozzle lance with at least one outlet opening, the straight nozzle lance penetrates into a bent pipe section (15) and the at least one outlet opening is designed in such a way that the reducing agent exits from the at least one outlet opening substantially in the direction of flow of the exhaust gas (9).

2. The device (1) according to claim 1, wherein the bent pipe section (15) has a curvature between 60 and 150°.

3. The device (1) according to claim 2, wherein the straight nozzle lance is enclosed, apart from the at least one outlet opening, by a protective pipe (25).

4. The device (1) according to claim 1, wherein the feeding apparatus (11) has a feed line with the at least one outlet opening, wherein the at least one outlet opening has a nozzle oriented substantially in the direction of flow of the exhaust gas (9) for injecting the reducing agent substantially in the direction of flow of the exhaust gas (9).

5. The device (1) according to claim 4, wherein the nozzle of the at least one outlet opening is an atomising nozzle for splitting the reducing agent into fine droplets.

6. The device (1) according to claim 5, wherein the atomising nozzle is a two-substance nozzle (19) which has a nozzle inner chamber (33) and a nozzle outer chamber (34), wherein the nozzle inner chamber (33) is for feeding a first medium, wherein the first medium contains the reducing agent, wherein the nozzle outer chamber (34) is for feeding a second medium.

7. The device (1) according to claim 6, wherein the two-substance nozzle (19) is an externally mixing two-substance nozzle which has a nozzle outlet (35), wherein the nozzle inner chamber (33) and the nozzle outer chamber (34) are separately connected to the nozzle outlet (35) for the separate discharge of the first medium and the second medium from the two-substance nozzle.

8. The device (1) according to claim 6, wherein the two-substance nozzle (19) is an internally mixing two-substance nozzle which has a mixing chamber (37), wherein the nozzle inner chamber (33) and the nozzle outer chamber

(34) are connected to the mixing chamber (37) for mixing the first medium with the second medium in the mixing chamber (37).

9. The device (1) according to claim 1, wherein the exhaust gas purification device (7) has, in the direction of flow of the exhaust gas (9) downstream of the feeding apparatus (11) and upstream of the unit (13) for selective catalytic reduction of nitrogen oxides, a conical pipe section (12) for the flow of the exhaust gas (9) therethrough, wherein the diameter of the conical pipe section (12) increases in the direction of flow of the exhaust gas (9), wherein the fed reducing agent is introduced into the conical pipe section (12) at least in stages.

10. The device (1) according to claim 9, wherein the conical pipe section (12) has a half opening angle of between 1 and 10°.

11. The device (1) according to claim 1, wherein the unit (13) for selective catalytic reduction has at least one denitrification catalyst (21) and at least one oxidation catalyst (22) for breaking down carbon monoxide and/or hydrocarbons and/or ammonia.

12. The device (1) according to claim 11, wherein the at least one denitrification catalyst (21) has a first coated metal support and a first washcoat and the at least one oxidation catalyst (22) has a second metal support and a second washcoat.

13. The device (1) according to claim 1, wherein the reducing agent comprises an ammonia-containing compound or a urea solution.

14. The device (1) according to claim 6, wherein the second medium comprises a compressed air.

15. The device (1) according to claim 11, wherein the at least one denitrification catalyst (21) includes at least two denitrification catalysts (21) that are provided in succession in the direction of flow of the exhaust gas (9).

16. The device (1) according to claim 12, wherein the first washcoat comprises oxides of titanium, vanadium and/or tungsten and the second washcoat comprises platinum and/or palladium.

17. A method for producing enamelled wires, comprising:
applying at least one enamel coating to a metal wire; and
solidifying the at least one enamel coating in a furnace (4), wherein an exhaust gas (9) from the furnace (4) is freed at least of nitrogen oxides, wherein the exhaust gas (9) from the furnace (4) is subjected to a selective catalytic reduction of nitrogen oxides, wherein a reducing agent is fed to the exhaust gas (9) via a feeding apparatus (11) comprising a straight nozzle lance, wherein the straight nozzle lance penetrates into a bent pipe section (15) and the reducing agent is introduced into the exhaust gas (9) substantially in the direction of flow of the exhaust gas (9).

18. The method according to claim 17, wherein the introduced reducing agent is liquid and evaporates in a conical pipe section (12), wherein ammonia is formed.

19. The method according to claim 17, wherein the mass flow of the exhaust gas (9) and the concentrations of the nitrogen oxides in the exhaust gas (9) are determined in the direction of flow before the reducing agent is fed and in the direction of flow after the selective catalytic reduction, wherein the amount of the introduced reducing agent is determined on the basis of the determined mass flow of the exhaust gas (9) and the determined concentrations of the nitrogen oxides in the exhaust gas (9).

20. The method according to claim 17, wherein the reducing agent comprises an ammonia-containing compound or a urea solution.

\* \* \* \* \*